April 21, 1970     A. M. BIGGAR     3,507,707
RESERVE BATTERY
Filed Feb. 28, 1967
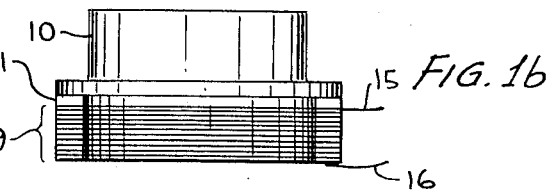
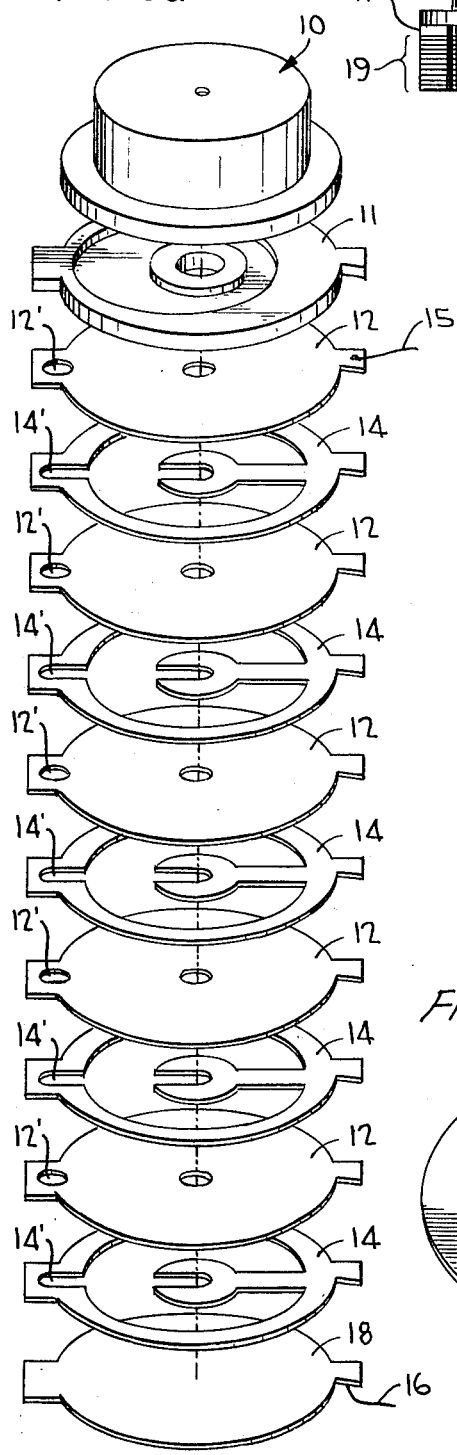
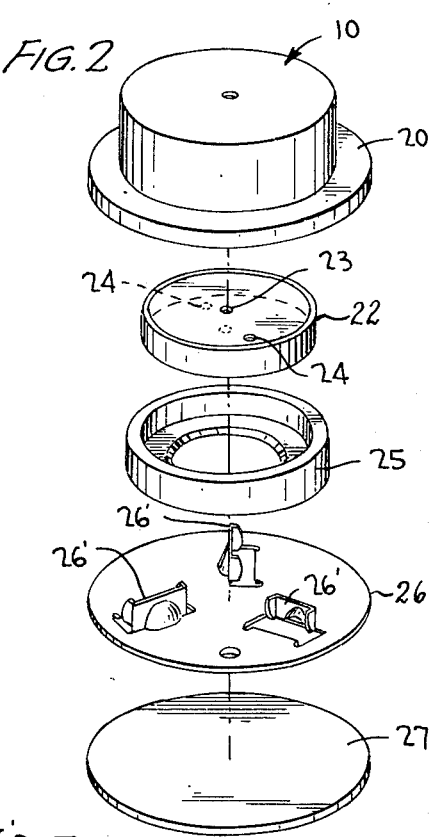
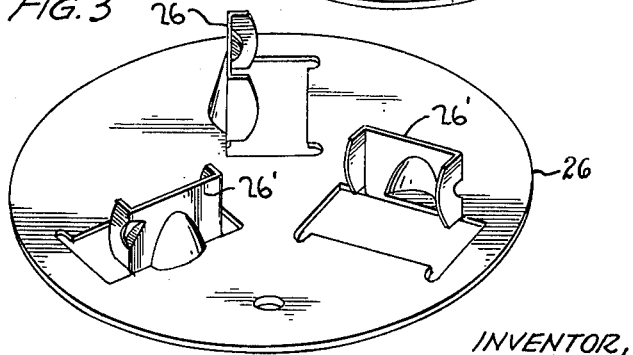
INVENTOR,
ALLAN M. BIGGAR
By: Harry M. Saragovitz,
Edward J. Kelly,
Herbert Berl &
L. P. Edgerton     Attorneys.

# United States Patent Office 3,507,707
Patented Apr. 21, 1970

3,507,707
RESERVE BATTERY
Allan M. Biggar, Arlington, Va., assignor to the United States of America as represented by the Secretary of the Army
Filed Feb. 28, 1967, Ser. No. 619,896
Int. Cl. H01m 21/14
U.S. Cl. 136—90                           5 Claims

ABSTRACT OF THE DISCLOSURE

In this disclosure is described a self-actuated battery which is supplied with electrolyte from a self-opening ampule. When the battery is spinning on its cylindrical axis a diaphragm across the end of the ampule is punctured by a unique cutter which responds to a combination of linear and angular acceleration forces thereby allowing the electrolyte to flow from the ampule through a fill channel into the battery cells. Intercell short circuits are eliminated by purging the fill channel of electrolyte with a high density liquid released from the ampule shortly after the electrolyte is released.

---

This invention relates to reserve sources of electrical energy and, in particular, to batteries of the self-actuating type.

Self-actuating batteries that respond to spin and/or linear acceleration have heretofore presented serious disadvantages to the designers of devices in which they have been used. The most significant disadvantage has been cost. Batteries of this type normally represent a substantial portion of the cost of the devices in which they have been incorporated, and in many cases the battery has been the most expensive item. In general wet cell series batteries have been used, and these, in addition to high cost, have shown an inability to differentiate between accidental drop and the forces to which they are designed to respond, susceptibility to intercell short circuits due to uneven filling of the cells, and unreliable response to activating forces.

It is therefore an object of this invention to provide a self-actuating battery of reduced cost.

Another object of this invention is to provide a self-actuated battery that will not respond to accidental dropping.

A further object of this invention is to provide a self-actuated battery in which the electrolyte is purged from the fill channel, to prevent short circuiting without contaminating the battery.

An additional object of this invention is to provide a self-actuated battery that will reliably respond to activating forces.

Still another object of this invention is to provide a self-actuated battery of improved efficiency.

Briefly, these and other objects are attained in a battery comprising two or more electrodes with appropriate separators between them which is supplied with electrolyte from a self-opening ampule located at one end of the electrode stack. When the battery is spinning on its cylindrical axis, a diaphragm across the end of the ampule is caused to be punctured thereby allowing the electrolyte to flow from the ampule into the cells through a channel near their periphery until equilibrium is reached. In order to alleviate the problem of intercell short circuits, the channel through which the electrolyte entered the cell is completely cleared of electrolyte after the cell is filled. This is accomplished by purging the fill channel with a non-conductive high density liquid released from the ampule shortly after the electrolyte is released.

The specific nature of the invention, as well as other objects, aspects, uses and advantages thereof, will clearly appear from the following description and from the accompanying drawing, in which:

FIGURE 1a is an exploded view of a typical embodiment of an entire battery assembly according to this invention.

FIGURE 1b is a side view of a typical embodiment of the assembled battery shown in FIGURE 1a.

FIGURE 2 is an exploded view of a typical embodiment of the ampule assembly.

FIGURE 3 is an isometric view of the cutter means of my invention used to puncture the diaphragm containing the electrolyte.

In the embodiment of the battery shown in FIGURE 1a a lead-lead dioxide-fluoboric acid electrochemical system is used. Wet cell series batteries have long been recognized as being particularly suitable for an application such as the one described herein. Previous experience has shown that cells consisting of lead and lead oxide plates with fluoboric acid as the electrolyte offer advantages over other known systems in that they have a long shelf life, require no field maintenance, meet rapid rise-time requirements, and operate well between −40 degrees and 165 degrees Fahrenheit. The battery assembly of FIGURE 1 comprises the following parts: a self-actuating ampule 10, a fluid channeling means 11, a stack of lead-lead oxide bimetal electrodes 12, a series of paper gaskets 14 separating each of the electrodes 12, and an end plate 18. The electrodes 12 are made from a bimetal strip having a thin steel base with a plating of metallic lead on one side and a plating of lead oxide on the other. The separators 14 are formed from thin strips of commercial bristol board. On the periphery of each electrode 12 and separator 14 holes 12′ and 14′, respectively, are punched. These holes, when the battery is assembled, will form the fill channel through which the electrolyte will pass when released from ampule 10. End plate 18 is slightly different from the other electrodes 14 in that no holes are punched in it, and each side of it is plated with metallic lead. Separators 14 are bonded to an adjacent electrode 12 by heating a commercially available two-ply laminator film with which each is coated. Channeling means 11 placed above the electrode stack is necessary to directly control the flow of electrolyte and heavy non-conductive liquid into the fill channel formed by holes 12′ and 14′.

Upon the application of the spin and linear acceleration forces to which the battery is designed to respond ampule 10, in a manner to be described in greater detail with respect to FIGURE 2, will release the electrolyte, in this case fluoboric acid, through channeling means 11, and the fill channel formed by holes 12′ and 14′ into the electrode stack thereby activating the battery. If, however, any of the electrolyte should remain in the fill channel, the battery would be subject to intercell short circuits. To forestall this possibility ampule 10, shortly after releasing the electrolyte and in a manner to be described in greater detail with respect to FIGURE 2, releases a high-density non-conductive liquid, such as methylene bromide, into the fill channel to purge it of electrolyte. Upon activation, voltage is available from the terminal wires 15 and 16 attached to the electrode 12 nearest the ampule and end plate 18, respectively.

FIGURE 1b is a side view of the completely assembled battery with like numbers referring to like elements as in FIGURE 1a. Ampule 10 is bonded to channeling means 11 which is bonded to electrode stack 19 comprising electrodes 12, separators 14, and end plate 18. Terminale wires 15 and 16 are connected to the uppermost of electrodes 12 and end plate 18, respectively.

In FIGURE 2 is shown an exploded view of the complete ampule assembly 10 which stores both the electrolyte and the high density non-conductive liquid and releases them in proper sequence for the battery to properly function as described above.

Self-actuated batteries of the liquid electrolyte type must be designed so that the electrode materials are not corroded by the electrolyte, or its fumes, prior to activation of the battery. It has been common practice to store the electrolyte in an ampule of glass, metal, or plastic until activation and then to puncture the container.

The fluoboric acid used as an electrolyte in the embodiment described herein emits highly corrosive fumes. In view of the permeability of plastic materials to gasses, it was believed that a plastic container would be of questionable value for long term storage. While glass containers would adequately confine the electrolyte and its fumes, it would be difficult to insure that there would be no breakage during rough handling, but dependable breakage when the battery is exposed to forces to which it is designed to respond. Most metals are attacked by fluoboric acid, but, in the absence of oxidizing agents, copper will remain unscathed. For this reason it was decided to use an ampule made of copper.

The ampule assembly 10, as shown in FIGURE 2, is contained in a thin-walled flanged copper cup 20. Capsule 22 placed inside cup 20 is a shallow enclosed hollow cylinder which serves as a container for the dense non-conductive liquid. Capsule 22 is filled with a finely divided granular, fibrous or spongy solid that has a greater affinity for the dense liquid than the electrolyte, so that only the dense liquid is absorbed therein. In this embodiment the dense liquid, methylene bromide, is absorbed into a polypropylene or Dynel fibre mass. Annular copper cup 25 fits against and around capsule 22 and provides the inertial force to release the electrolyte as described below. Cutter 26 is placed beneath ring 25, and diaphragm 27, by crimping, seals the entire assembly and the electrolyte into cup 20.

In operation diaphragm 27, which is a thin sheet of copper foil, is punctured by cutter leaflets 26', which have cutting points mounted on them perpendicular thereto, to release the electrolyte in cup 20 and later the dense liquid in capsule 22. This puncturing operation is accomplished by bending cutter leaflets 26' from their normal vertical position to substantially a horizontal position to bring the cutting points into contact with diaphragm 27. When the battery is subjected to sufficient spin and linear acceleration, the inertial mass of ring 25, which was selected to have a significantly higher specific gravity than the electrolyte, is brought to bear on cutter leaflets 26'. Because cutter 26 is manufactured from half-hard copper strip, cutter leaflets 26' provide sufficient spring pressure to support ring 25 until folded over by the combined action of a load produced by linear acceleration and a tipping force produced by angular acceleration. Accidental shocks are highly unlikely to produce the necessary combination of forces.

The advantages of using the same container for both the electrolyte and the dense liquid are evident, but disadvantages at the time of activation and release into the cell can be seen. The flow of the liquids from the ampule into the cells probably would take place at a high enough velocity to sweep all of the dense liquid into cells most remote from the ampule; this could create, in the remote cells, an electrolyte deficiency and in the cells nearer the ampule the possibility of short circuits due to a failure to isolate them. Thus, the design of an electrolyte-dense liquid releasing system resolved itself into a problem of designing a sequencing means whereby the release of the dense liquid is delayed until flow of the electrolyte into the cells is complete. Of course, such a system must isolate the cells as soon as practicable after they have been filled with electrolyte in order to minimize short circuit losses occurring prior to isolation.

In the design arrived at the dense liquid, in this embodiment methylene bromide, is put into capsule 22 and absorbed into a polypropylene fiber mass. When the battery is subjected to spin forces, centrifugal force acting on the polypropylene fiber mass will cause the methyl bromide absorbed therein to separate and escape through holes 24 on the periphery of each end of capsule 22. Because holes 23 are at the axis of rotation, they are neutral, and no dense liquid escapes therefrom. The time consumed by the dense liquid in escaping from holes 24 and proceeding across the boundary area between capsule 22 and the holes punctured in diaphragm 27 is sufficient to allow the electrolyte to fill each of the cells and substantially reach a state of equilibrium. Upon release, the dense liquid will purge the electrolyte from the fill channel isolating each of the cells.

As discussed earlier, a major object of this invention is to substantially reduce the cost of self-actuated batteries. This has been achieved. In production quantities the battery of my invention costs substantially less than the cost of presently-used batteries of the self-actuated type.

The battery has been shown to be substantially unresponsive to accidental dropping in tests where it has been dropped from heights of from three to six feet simulating the handling that might be expected in shipping. After such drops the batteries were subjected to the forces to which they were designed to respond, and they operated as expected and described herein.

To test the ability of the dense liquid to prevent inter-cell shorting a pre-punctured ampule was mounted on a stack of nine parallel cells in which ten electrodes, nine separators, all having the same geometry as those in the actual battery, and nine polyester barrier plates were arranged in such a manner that the electrodes were in electrical contact only through the electrolyte in the fill channel of the barrier plates. The effective cross-sectional area of the fill channel was 0.071 sq. in. The assembly was sealed with epoxy resin in the same manner as an actual battery and a small centrally located hole was drilled in the bottom of the ampule can. The assembly was mounted on a high speed spinner with slip rings connected to the battery electrodes and to an AC resistance bridge. With the assembly spinning at approximately 40 revolutions per second, a 50 percent solution of fluoboric acid was injected into the ampule with a hypodermic needle. When the acid entered the stack it filled the cells and the resistance was measured to be 10 ohms. The dense liquid was then injected in the same manner and the resistance promptly rose to 100K ohms.

The battery has been found to meet the load requirements of the devices in which it is designed to be used as well as being virtually noise-free. Measured noise has been less than 20 millivolts for a 40-volt output.

It will be apparent that the embodiment described herein is only exemplary and that various modifications can be made in construction and arrangement, in particular, that the improvements contemplated by my invention may be applied to any type battery, within the scope of the invention as defined in the appended claims.

I claim as my invention:

1. A self-actuated battery of substantially reduced cost that is not subject to internal short circuits, comprising:
   (a) a plurality of flat electrodes arranged in a stack with each of said electrodes being separated by a gasket, said electrodes being coated with a metal on one side and an oxidizing substance on the opposite side chosen so that said metal and said oxidizing substance in cooperation with an electrolyte will produce electrical energy, said electrodes being stacked so that said metal and said oxidizing substance face each other thereby forming a series of individual electrical cells,
   (b) a fluid intake means passing through said plurality of electrodes whereby each of said cells may be substantially equally filled with electrolyte, (c) a first container placed adjacent to said plurality of electrodes for storage of electrolyte, (d) opening means placed within said first container operable to puncture said first container upon the application of forces to which said opening means is designed to respond allowing electrolyte to flow from said first container into said fluid intake means, (e) a high density non-conductive liquid, and (f) a second container placed within said first container, filled with said high density liquid, and having holes punched in said second container whereby when said battery is subjected to the forces to which it is designed to respond said high density liquid will be released into said fluid intake means immediately after the electrolyte is released from said first container.

2. The self-actuated battery of claim 1 in which said second container is filled with an absorbent material having a great affinity for said high density liquid and little affinity for the electrolyte whereby said high density liquid is absorbed by said absorbent material and is adapted to be released therefrom when said second container is subjected to centrifugal force of a predetermined amount.

3. The self-actuated battery of claim 2 in which said first container is an ampule with a thin foil diaphragm placed across the end of said ampule adjacent to said plurality of electrodes.

4. The self-actuated battery of claim 3 in which said opening means comprises an inertial mass and a cutting means placed adjacent to said diaphragm and positioned so that with spin and linear acceleration forces acting on said inertial mass it will force the cutting points on said cutting means into contact with said diaphragm causing said diaphragm to be punctured.

5. A self-actuated battery comprising a plurality of flat electrodes, each of said electrodes coated with a metal on one side and with an oxidizing substance on its opposite side, said metal and said oxidizing substance chosen so that in combination with an electrolyte they will produce electrical energy, each of said electrodes being arranged in a stack with said metal and said oxidizing substance facing each other and separated by a gasket so as to form individual cells, a fill channel through each of said cells allowing said cells to be substantially filled with electrolyte, and a new self-opening ampule containing electrolyte and a high density non-conductive liquid placed adjacent to said plurality of electrodes and said fill channel whereby said electrolyte and said high density liquid are released in sequence into said fill channel upon the application of spin and linear acceleration to said battery; said new self-opening ampule comprising:

(a) a cup having a flange around the open end of said cup, said flanged end of said cup being placed adjacent to said plurality of electrodes and said fill channel, (b) a thin foil diaphragm placed across said open end of said cup and crimped around said flange, (c) a thin hollow cylinder having a hole punched in the periphery of either end thereof placed in said cup and filled with an absorptive material having a great affinity for said high density liquid and little affinity for said electrolyte, (d) a thin disc-shaped element placed adjacent to said diaphragm having leaves cut from the surface thereof and bent vertically therefrom, said leaves having cutting edges whereby said diaphragm will be punctured when said leaves are returned to their original horizontal position, and (e) an annular inertial mass enclosing and supporting said thin hollow cylinder and resting on said leaves of said thin disc-shaped element whereby when said battery is subjected to spin and linear acceleration said inertial mass will force said leaves into a horizontal position puncturing said diaphragm and releasing electrolyte into said fill channel, further spin will then cause said high density liquid to be released from said thin hollow cylinder through said peripheral holes thereon.

References Cited

UNITED STATES PATENTS

| 3,346,420 | 10/1967 | Snyder | 136—90 |
| 3,193,413 | 7/1965 | Tamminen | 136—90 |
| 3,150,010 | 9/1964 | Cleveland | 136—90 |

FOREIGN PATENTS

| 705,974 | 3/1965 | Canada. |

CARL D. QUARFORTH, Primary Examiner

H. E. BEHREND, Assistant Examiner